US012159730B2

(12) United States Patent
Kuroda et al.

(10) Patent No.: US 12,159,730 B2
(45) Date of Patent: Dec. 3, 2024

(54) SIGNAL TRANSMISSION CABLE AND CABLE ASSEMBLY

(71) Applicant: Hitachi Metals, Ltd., Tokyo (JP)

(72) Inventors: Hiromitsu Kuroda, Tokyo (JP); Tamotsu Sakurai, Tokyo (JP); Yoshiki Nakade, Hitachi (JP); Detian Huang, Tokyo (JP); Xinweilong Li, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/837,733

(22) Filed: Jun. 10, 2022

(65) Prior Publication Data

US 2023/0008828 A1 Jan. 12, 2023

(30) Foreign Application Priority Data

Jun. 30, 2021 (JP) ................................ 2021-109033

(51) Int. Cl.
*H01B 11/18* (2006.01)
*H01B 13/22* (2006.01)

(52) U.S. Cl.
CPC ....... *H01B 11/1821* (2013.01); *H01B 13/225* (2013.01)

(58) Field of Classification Search
CPC .... H01B 7/226; H01B 7/1895; H01B 7/0861; H01B 11/1821
See application file for complete search history.

(56) References Cited

U.S. PATENT DOCUMENTS

2021/0217542 A1* 7/2021 Chuganey ............ H01B 7/0861
2021/0399396 A1* 12/2021 Huang ...................... H01P 3/06

FOREIGN PATENT DOCUMENTS

JP 2000-285747 A 10/2000
JP 2003-045244 * 2/2003
JP 2003-187649 * 7/2003

OTHER PUBLICATIONS

Japanese Office Action 2021-109033 issued on Jul. 16, 2024 with English translation thereof.

* cited by examiner

*Primary Examiner* — Chau N Nguyen
(74) *Attorney, Agent, or Firm* — MCGINN I.P. LAW GROUP, PLLC

(57) ABSTRACT

A signal transmission cable includes a conductor, an insulator covering a periphery of the conductor, and a shield layer covering a periphery of the insulator. The shield layer includes a lateral winding shield portion composed of a plurality of metal wires being helically wrapped around the periphery of the insulator to cover the periphery of the insulator, and a batch plating portion composed of a hot dip plating, which is covering a periphery of the lateral winding shield portion. Where a diameter of the metal wire is d and a thickness of the batch plating portion from an outer surface of the metal wire is t, a formula t<0.5d is met over an entire cable circumference. When the signal transmission cable is bent in a U-shape within a range of a bending strain of 35% or less, no cracks occur in the batch plating portion.

5 Claims, 7 Drawing Sheets

SIGNAL TRANSMISSION CABLE AND CABLE ASSEMBLY

CROSS-REFERENCE TO RELATED APPLICATION

The present patent application claims the priority of Japanese patent application No. 2021-109033 filed on Jun. 30, 2021, and the entire contents thereof are hereby incorporated by reference.

TECHNICAL FIELD

The present invention relates to a signal transmission cable and a cable assembly.

BACKGROUND ART

A coaxial cable is used as a cable designed to carry out a high frequency signal transmission and to be used as an internal wiring in an image recording device to be used in an automatic operation or the like, or as an internal wiring in an electronic device such as a smartphone or a tablet terminal or the like, or as a wiring in a machine tool such as an industrial robot or the like.

As the conventional coaxial cable, there is known one with a shield layer being configured in such a manner that a taping member such as a copper tape or the like provided with a copper foil on a resin layer is helically wrapped around a periphery of an insulator (see, e.g., Patent Literature 1).

CITATION LIST

Patent Literature

Patent Literature 1: JP2000-285747A

SUMMARY OF THE INVENTION

However, in the conventional coaxial cable described above, there is a problem with a phenomenon called "suck-out" occurring, which refers to a rapid attenuation caused in a predetermined frequency band (e.g., a band of several GHz such as 1.25 GHz or the like).

On the other hand, for example, by configuring the shield layer in such a manner that the outer surface of the insulator is subjected to a plating, it is possible to suppress the occurrence of the suck-out. However, when the coaxial cable has been repeatedly bent, a crack formation in its shield layer made of the plating has occurred or a peeling off of that shield layer made of the plating from the outer surface of the insulator has occurred. The occurrence of the crack formation in its shield layer made of the plating or the peeling off of that shield layer made of the plating from the outer surface of the insulator has led to a degradation in the shielding effect. That is, the shielding effect of the shield layer on the noise caused in the coaxial cable has been degraded.

In light of the foregoing, it is an object of the present invention to provide a signal transmission cable, and a cable assembly, which are designed to be resistant to the occurrence of a degradation in the shielding effect, and to be resistant to the occurrence of a rapid attenuation in a predetermined frequency band.

For the purpose of solving the aforementioned problems, one aspect of the present invention provides a signal transmission cable, comprising: a conductor; an insulator covering a periphery of the conductor; and a shield layer covering a periphery of the insulator, wherein the shield layer includes a lateral winding shield portion comprising a plurality of metal wires being helically wrapped around the periphery of the insulator to cover the periphery of the insulator, and a batch plating portion comprising a hot dip plating, which is covering a periphery of the lateral winding shield portion, wherein where a diameter of the metal wire is d and a thickness of the batch plating portion from an outer surface of the metal wire is t, a following formula is met over an entire cable circumference, $t<0.5d$, and when being bent in a U-shape within a range of a bending strain of 35% or less, no cracks occur in the batch plating portion.

Furthermore, for the purpose of solving the aforementioned problems, another aspect of the present invention provides a cable assembly comprising: the signal transmission cable as described above; and a terminal member integrally provided to at least one end portion of the signal transmission cable.

Effects of the Invention

According to the present invention, it is possible to provide the signal transmission cable, and the cable assembly, which are designed to be resistant to the occurrence of a degradation in the shielding effect, and to be resistant to the occurrence of a rapid attenuation in a predetermined frequency band.

BEST MODE FOR CARRYING OUT THE INVENTION

Embodiment

Embodiment of the present invention will be described below in conjunction with the accompanying drawings.

(Overall Configuration of a Coaxial Cable 1)

Figure 1A:
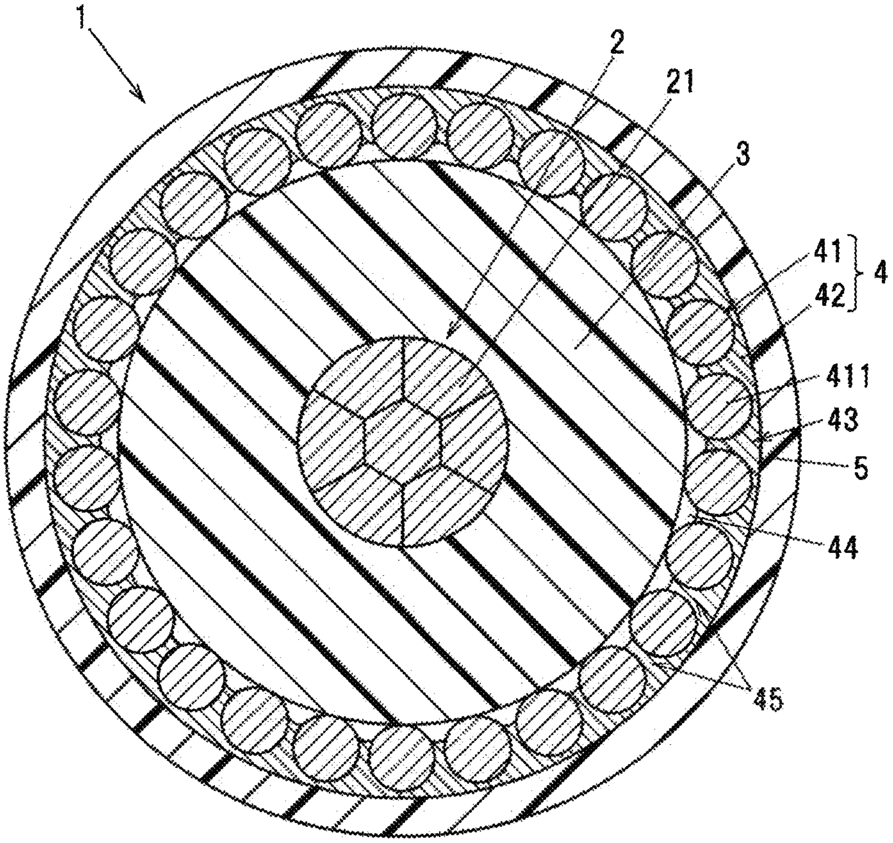
FIG. 1A is a cross-sectional view showing a cross section perpendicular to a longitudinal direction showing a coaxial cable as a signal transmission cable according to an embodiment of the present invention.
Figure 1B:
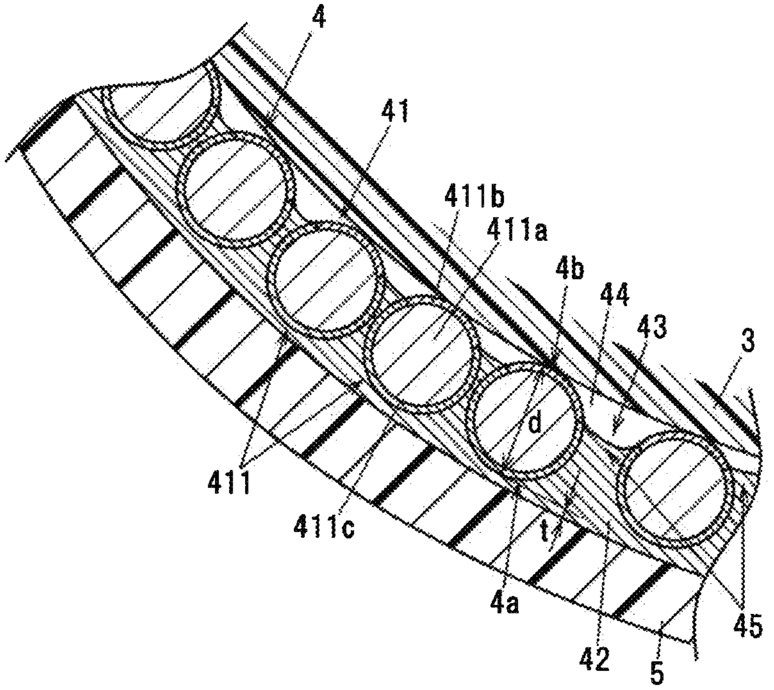
FIG. 1B is an enlarged view of an essential portion of the coaxial cable shown in FIG. 1A.

FIG. 1A is a cross-sectional view showing a cross section perpendicular to a longitudinal direction showing a coaxial cable 1 as a signal transmission cable according to an embodiment of the present invention. FIG. 1B is an enlarged view of an essential portion of the coaxial cable 1 shown in FIG. 1A.

As shown in FIGS. 1A and 1B, the coaxial cable 1 as the signal transmission cable includes a conductor 2, an insulator 3, which is provided to cover a periphery of the conductor 2, and a shield layer 4, which is provided to cover a periphery of the insulator 3, and a sheath 5, which is provided to cover a periphery of the shield layer 4.

The conductor 2 is composed of a stranded wire conductor, which is formed by stranding a plurality of metal wires (strands, elementary wires) 21 (i.e., first metal wires 21) together. In the present embodiment, as the conductor 2, a compressed stranded wire conductor is used. The compressed stranded wire is produced by stranding the plurality of metal wires 21 together, and subsequently subjecting the stranded metal wires 21 to a compression working in such a manner that the cross-sectional shape perpendicular to the longitudinal direction of the coaxial cable 1 becomes a circular shape. The use of the compressed stranded wire conductor as the conductor 2 allows the electrical conductivity of the conductor 2 to be enhanced, the good transmission property of the conductor 2 to be obtained, and the high bendability of the conductor 2 to be maintained. As the conductor 2, for example, an annealed copper wire (soft coper wire) with an outer diameter of 0.023 mm may be used. Further, the metal wire 21 may be composed of a copper alloy wire including tin (Sn), silver (Ag), indium (In), titanium (Ti), magnesium (Mg), iron (Fe) or the like, from the point of view of enhancing the electrical conductivity and the mechanical strength of the metal wire 21.

The insulator 3 is composed of, e.g., PFA (perfluoro alkoxy alkane), or FEP (fluorinated ethylene tetrafluoride/propylene hexafluoride copolymer) fluoropolymer resin, polyethylene, polypropylene or the like. The insulator 3 may be composed of a foamed resin, or may be composed of a crosslinked resin in order to enhance the heat resistance of the insulator 3. Further, the insulator 3 may be configured to have a multi-layer structure. For example, the insulator 3 can also be configured to have a three-layer structure composed of a first non-foamed layer made of non-foamed polyethylene, which is covering a periphery of the conductor 2, a foamed layer made of foamed polyethylene, which is covering a periphery of the first non-foamed layer, and a second non-foamed layer made of non-foamed polyethylene, which is covering a periphery of the foamed layer. In the present embodiment, the insulator 3 made of PFA is formed over the periphery of the conductor 2 by tube extrusion. By forming the insulator 3 over the periphery of the conductor 2 by the tube extrusion, the insulator 3 is easily peeled off from the conductor 2 during termination working, and the termination workability is therefore enhanced.

The sheath 5 is composed of, e.g., fluoropolymer resin such as PFA or FEP or the like, polyvinyl chloride, cross-linked polyolefin, or the like. In the present embodiment, the sheath 5 made of fluoropolymer resin is formed by tube extrusion.

(Shield Layer 4)

In the coaxial cable 1 according to the present embodiment, the shield layer 4 includes a lateral winding shield portion 41, which is formed by a plurality of metal wires 411 (i.e., second metal wires 411) being helically wrapped around a periphery of the insulator 3, and a batch plating portion 42 having an electrical conductivity, which is provided to batch cover a periphery of the lateral winding shield portion 41 together.

In the present embodiment, since the plurality of metal wires 411 are fixed with the batch plating portion 42, in order to ensure the high bendability of the coaxial cable 1, there is the need to use a metal wire made of a material having a low yield strength that is easily plastically deformed, in the plurality of metal wires 411. More specifically, a metal wire having a tensile strength of 200 MPa or more and 380 MPa or less and an elongation of 7 percent or more and 20 percent or less may be used in the plurality of metal wires 411.

In the present embodiment, for each of the plurality of metal wires 411, a silver-plated annealed copper wire having a plating layer 411*b* made of silver on the periphery of a metal core wire 411*a* made of an annealed copper wire is used. Note that the metal core wire 411*a* to be used in the plurality of metal wires 411 is not limited to the above annealed copper wire, but that a copper alloy wire, an aluminum wire, an aluminum alloy wire, or a wire rod having a low softening temperature with a trace amount of metal elements (e.g., titanium, magnesium, or the like) being added to a pure copper, or the like, can be used as the metal core wire 411*a* to be used in the plurality of metal wires 411. Further, the metal for constituting the plating layer 411*b* to be used in the plurality of metal wires 411 is not limited to silver. For example, tin or gold may be used in the plating layer 411*b*. However, in order to achieve good electrical characteristics of the coaxial cable 1, it is preferable that the plating layer 411*b* has a high electrical conductivity, and it is preferable to use a material with at least a higher electrical conductivity than the batch plating portion 42. In other words, it is more preferable to use the plating layer 411*b*, made of silver with a high electrical conductivity. In addition, a diameter (outer diameter) d of the metal wire 411 is preferably 0.02 mm or more and 10 mm or less. Herein, the lateral winding shield portion(s) 41 are formed by using twenty-two (22) metal wires 411 made of a silver-plated annealed copper wire having an outer diameter of 0.025 mm.

Further, in the present embodiment, a plating portion made of tin is used in the batch plating portion 42 made of a hot dip plating. It should be noted, however, that the batch plating portion 42 is not limited thereto. For example, a plating portion made of silver, gold, copper, zinc or the like can be used in the batch plating portion 42. It should be noted, however, that, from the point of view of the ease of the production, it is more preferable to use the batch plating portion 42 made of tin.

Figure 2:
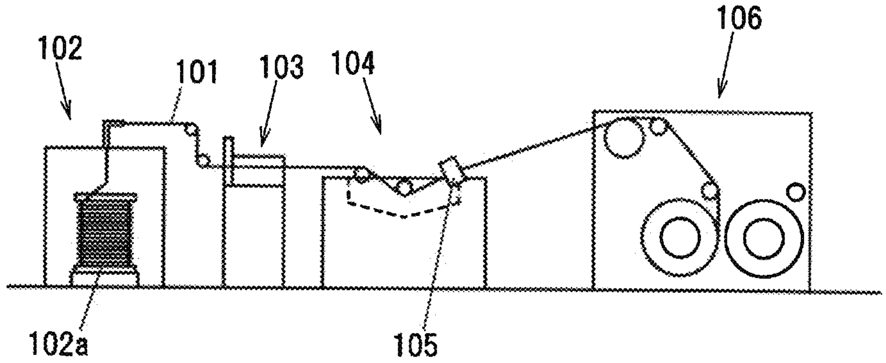
FIG. 2 is an explanatory diagram showing a formation of a batch plating portion.

FIG. 2 is an explanatory diagram showing a formation of the batch plating portion 42. First, before the formation of the batch plating portion 42, several metal wires 411 are stranded together around the insulator 3 to form the lateral winding shield portion. The lateral winding shield portion 41 formed around the insulator 3 is called as a cable base 101. When forming the batch plating portion 42, a drum 102*a* with the cable base 101 being wound therearound is set to an outfeed unit 102, and the cable base 101 is fed from the outfeed unit 102. The cable base 101, which is fed by the outfeed unit 102, is introduced into a flux bath (flux tank) 103, and the flux is applied around the cable base 101 (i.e., around the lateral winding shield portion 41). The flux is designed to facilitate the adhesion of the molten tin to an entire periphery of the lateral winding shield portion 41, and e.g., rosin-based flux or the like can be used.

The cable base 101 after passing through the flux bath 103 is introduced into a plating tank 104, which contains the molten tin at a temperature of 250° C. or more and less than 300° C. and passes through a die 105. After passing through the die 105, the remaining tin is cooled to form the batch plating portion 42. In other words, the batch plating portion 42 is a molten plating layer formed by the molten plating. Then, the cable base 101 provided with the batch plating portion 42 is wound up by a winding unit 106. A wire velocity of the cable base 101 provided with the lateral winding shield portion 41 is e.g., 40 m/min or more and 80 m/min or less, and preferably 50 m/min or more and 70 m/min or less.

In forming the batch plating portion 42, the silver constituting the plating layer 411*b* in the part of the metal wire 411 to be brought into contact with the molten tin (in other words, the hot dip plating) is diffused into that molten tin in the bath, and an intermetallic compound 411*c* including copper and tin therein is formed between the metal wire 411 and the batch plating portion 42 (in other words, in the part between the metal core wire 411*a* and the batch plating portion 42, and in abutment with a surface of the metal wire 411). As a result of EDX analysis (analysis by energy dispersion type X-ray spectroscopy) using an SEM (scanning electron microscope) by the present inventors, the intermetallic compound 411*c* composed of copper and tin was identified as having occurred in the form of a layer on the surface of the metal wire 411 (between the metal wire 411 and the batch plating portion 42). That is, the intermetallic compound 411*c* is a compound formed with a compound layer on the surface of the metal wire 411 being produced by a metallic diffusion reaction between the metal element (tin, or the like), which constitutes the batch plating portion 42 made of a hot dip plating, and the metal element (copper, or the like), which constitutes the primary component of the metal wire 411. A thickness of a layer of the intermetallic compound 411*c* is on the order of e.g., from 0.2 μm to 1.5 μm. Note that although silver constituting the plating layer 411*b* is considered to be included in the intermetallic compound 411*c*, an amount of silver included in the intermetallic compound 411*c* is a trace amount which is difficult to be detect by the EDX analysis.

By the shield layer 4 being formed with the intermetallic compound 411*c* between the metal wire 411 and the batch plating portion 42, when the coaxial cable 1 is repeatedly subjected to a bending or a torsion, the batch plating portion 42 becomes resistant to the occurrence of a peeling off the surface of the metal wire 411 and becomes resistant to the occurrence of a gap formation between the metal wire 411 and the batch plating portion 42. As a result, in the coaxial cable 1, even when subjected to a bending or a torsion, the batch plating portion 42 is able to hold the lateral winding shield portion 41 in a state of being fixed from the outer side of the lateral winding shield portion 41, and thereby becomes resistant to the occurrence of a change in the distance between the shield layer 4 and the conductor 2. For that reason, it is possible to make the coaxial cable 1 resistant to the occurrence of a lowering in the shielding effect due to being subjected to a bending or a torsion, and also make the coaxial cable 1 resistant to the occurrence of a rapid attenuation in a predetermined frequency band. The thickness of the layer of the intermetallic compound 411*c* is obtained, for example by using an optical microscope or an electron microscope to observe the transverse cross section of the coaxial cable 1 (the cross section which is perpendicular to the longitudinal direction of the coaxial cable 1).

The plating layer 411*b* made of silver remains on the part of the metal wire 411 being not brought into contact with the batch plating portion 42 (i.e., the part of the metal wire 411 being not brought into contact with the tin melted during plating). That is, the plating layer 411*b* made of silver remains on the part of the metal wire 411 located inward (the insulator 3 side) in the radial directions of the coaxial cable 1. That is, the shield layer 4 in the coaxial cable 1 according to the present embodiment may be configured to be higher in the electrical conductivity in an inner peripheral portion 4*b* in which the plurality of metal wires 411 are not being coated with the batch plating portion 42, than in an outer peripheral portion 4*a* in which the plurality of metal wires 411 are coated with the batch plating portion 42. In the high frequency signal transmission, the electric current is concentrated in the insulator 3 side of the shield layer 4. Therefore, by providing the plating layer 411*b* including silver or the like having a high electrical conductivity in the inner peripheral portion 4*b* of the shield layer 4, it is possible to suppress the occurrence of lowering in the electrical conductivity of the shield layer 4, and thereby maintain the good attenuation property of the coaxial cable 1. The electrical conductivity of the tin plating constituting the batch plating portion 42 is 15% IACS, and the electrical conductivity of the silver plating constituting the plating layer 411*b* of the plurality of metal wires 411 is 108% IACS.

Note that the outer peripheral portion 4*a* refers to the portion in which the metal wire 411 is brought into contact with the plating (tin or the like) melted during hot dip plating (that is, the portion in which the intermetallic compound 411*c* is formed). The inner peripheral portion 4*b* refers to the portion in which the plating layer 411*b* made of a silver plating or the like is remaining.

The shield layer 4 includes a gap (space) 45 where adjacent metal wires 411, 411 are spaced apart from each other in the circumferential direction of the coaxial cable 1. Note that all of the adjacent ones of the plurality of metal wires 411 in the circumferential direction are not necessarily spaced apart from each other, and some of the adjacent ones of the plurality of metal wires 411 in the circumferential direction may be brought into contact with each other to provide contacting portions. In each contacting portion, at the outer periphery of the lateral winding shield portion 41, a space between the adjacent ones of the plurality of metal wires 411, 411 in the circumferential direction is filled with the batch plating portion 42, to provide a filled portion.

The shield layer 4 includes the joining portion 43 where the adjacent metal wires 411, 411 in the circumferential direction are joined with each other with the batch plating portion 42. It is desirable that the batch plating portion 42 is provided to batch coat the entire periphery of the lateral winding shield portion 41 together in the circumferential direction and the axial direction of the coaxial cable 1, and mechanically and electrically connect the plurality of metal wires 411 together. In the shield layer 4 of the coaxial cable 1 according to the present embodiment, the joining portion 43 is provided between the adjacent inner peripheral portions 4*b*, 4*b*. Since a portion around the inner peripheral portion 4*b* is not coated by the batch plating portion 42, an air layer 44 is provided between the inner peripheral portions $4b$, $4b$ of the adjacent metal wires 411, 411 and between the outer surface of the insulator 3 and the inner surface of the batch plating portion 42 (joining portion 43). As to the air layer 44, the inner surface of the joining portion 43 which is opposite to the outer surface of the insulator 3 has a curved shape so that it recesses toward the inner side of the joining portion 43. With this curved shape, an air layer 44 with a predetermined size can be generated between the outer surface of the insulator 3 and the inner surface of the joining portion 43. Thus, it is possible to achieve the coaxial cable 1, which is less likely to cause a reduction in the shielding effect and less likely to cause the rapid attenuation in a specific frequency band (for example, the frequency band up to 26 GHz).

For example, if the shield layer 4 is consisted of the lateral winding shield portion 41, a gap will occur between the metal wires 411, 411 and the noise characteristics will be deteriorated. Moreover, the influence of the gap between the metal wires 411, 411 causes a phenomenon called a suck-out, which causes a rapid attenuation in a predetermined frequency band (for example, the band from 10 GHz to 25 GHz). In the present embodiment, the batch plating portion 42 consisting of the molten plating is provided to cover the entire circumference of the lateral winding shield portion 41. Therefore, the batch plating portion 42 can block the gap between the metal wires 411, 411, thereby improving the shielding effect. This makes it less likely to cause the loss of signal transmission. Furthermore, by eliminating the gap between the metal wires 411, 411, it is possible to suppress the occurrence of the suck-out.

In addition, by providing batch plating portion 42 to cover the periphery of the lateral winding shield portion 41, when the sheath 5 is removed at a cable end portion to expose the shield layer 4 during terminal processing, the metal wires 411, 411 becomes difficult to unravel. Therefore, it is possible to easily process the terminal. Furthermore, it is also possible to maintain a stable and constant impedance in the cable longitudinal direction by providing the batch plating portion 42 to cover the periphery of the lateral winding shield portion 41.

(Thickness of the Batch Plating Portion 42)

The coaxial cable 1 in the present embodiment, over the entire cable circumference (i.e., an entire circumference of the coaxial cable 1), meets the following formula (1), where a diameter of the metal wire 411 in the lateral winding shield portion 41 is d and a thickness of the batch plating portion 42 from an outer surface of the metal wire 411 is t, $$t<0.5d \quad (1).$$

This suppresses the thickness t of the batch plating portion 42 from becoming uneven in a cable circumferential direction and in a cable longitudinal direction (i.e., the variation in thickness t is less than 0.5d is suppressed), so that a strain loaded on the lateral winding shield portion 41 is suppressed from being uneven when the coaxial cable 1 is bent. As a result, it is possible to suppress the variation in flexibility and the variation in bending property (variation in each direction of bending and variation in the cable longitudinal direction) of the coaxial cable 1.

In addition, the thickness t of the batch plating portion 42 is set to be less than 0.5d, which reduces the strain ES that is loaded on a surface of the shield layer 4, thereby improving the flexibility, and also extending the bending life when bending is performed repeatedly on the coaxial cable 1 (i.e., the shield layer 4 is less likely to be broken by the repeated bending). The strain ES, which is loaded on the surface of the shield layer 4, is expressed by the following formula (2), $$\varepsilon s=(t+d)/(2\cdot R) \quad (2),$$

where d is the diameter of the metal wire 411 (the thickness of the lateral winding shield portion 41), and R is a bending radius.

In addition, the thickness t of the batch plating portion 42 is set to be less than 0.5d, which will suppress cracking of the batch plating portion 42 when the coaxial cable 1 is bent with a small bending radius. The thickness t of the batch plating portion 42 refers to the thickness of the batch plating portion 42, which is located radially outwardly with respect to the lateral winding shield portion 41 (the metal wire 411) and means the thickness along the cable radial direction from the outermost location in the cable radial direction of the outer surface of the metal wire 411 (the furthest location from the cable center). In other words, the thickness t of the batch plating portion 42 indicates the thickness of the batch plating portion 42 in the thinnest portion around the metal wire 411.

Note that the thickness t of the batch plating portion 42 is preferably greater than 0, as the transmission characteristics may be adversely affected if the metal wire 411 is not covered by the batch plating portion 42. It is more preferable that the thickness t of the batch plating portion 42 meets the following formula (3) over the entire cable circumference, $$0<t<0.5d \quad (3).$$

The inventors prepared the coaxial cable 1 in FIGS. 1A and 1B and conducted a test for measuring the change in characteristic impedance along the cable longitudinal direction when the coaxial cable 1 was bent in a U-shape (hereinafter referred to as "bending test"). Here, a coaxial cable 1 (Example 1) according to 36 AWG (American wire gauge) in which the cable outer diameter D is 0.575 mm and a coaxial cable 1 (Example 2) according to 38 AWG in which the cable outer diameter D is 0.400 mm were prepared. In either of the coaxial cables 1 in Examples 1 and 2, as the lateral winding shield portion 41, the metal wire 411 with the diameter d of 0.05 mm was used and the thickness T of the sheath 5 was 0.05 mm. The cross-sections of the coaxial cables 1 in Examples 1 and 2 were observed. The thickness t of the batch plating portion 42 was approximately 0.005 mm (5 μm) and met the condition of t<0.5d (=0.025).

Similarly, as a comparative example, a coaxial cable according to 30 AWG with the cable outer diameter D of 1.08 mm was prepared, and the bending test was conducted in the same way as in Examples 1 and 2. In the coaxial cable in the comparative example, as the lateral winding shield portion 41, the metal wire 411 with the diameter d of 0.05 mm was used and the thickness T of the sheath 5 was 0.05 mm. The cross-section of the coaxial cable in the comparative example was observed. The thickness t of the batch plating portion 42 was approximately 0.040 mm (40 μm) and t was greater than 0.5d (=0.025) so that the thickness t did not meet the condition of t<0.5d.

Figure 3A:
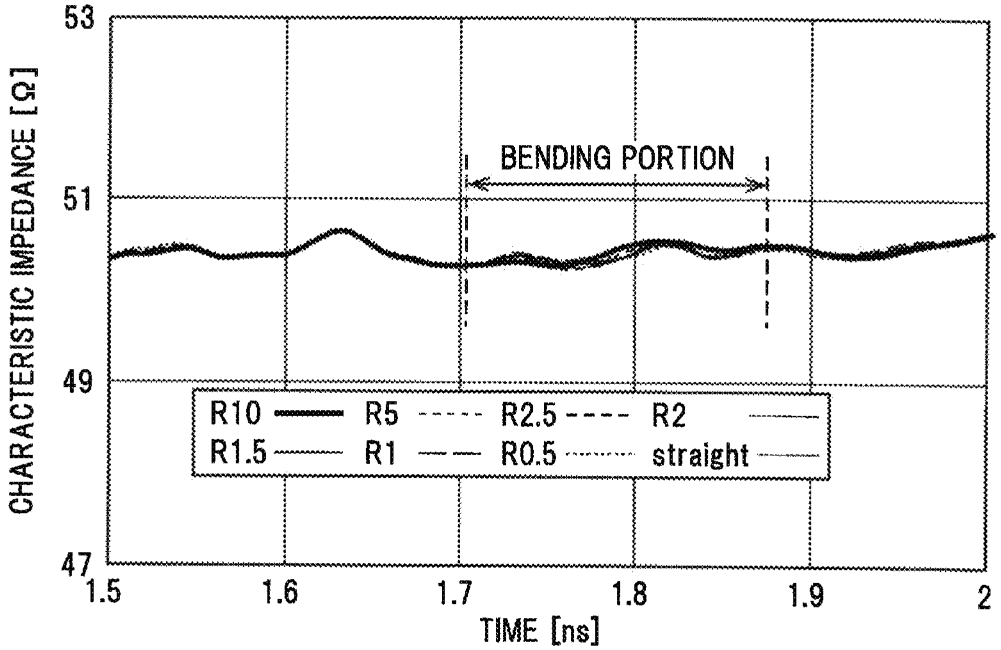
FIG. 3A is a graph chart showing measurement results of a characteristic impedance of Example 1 in bending test.
Figure 3B:
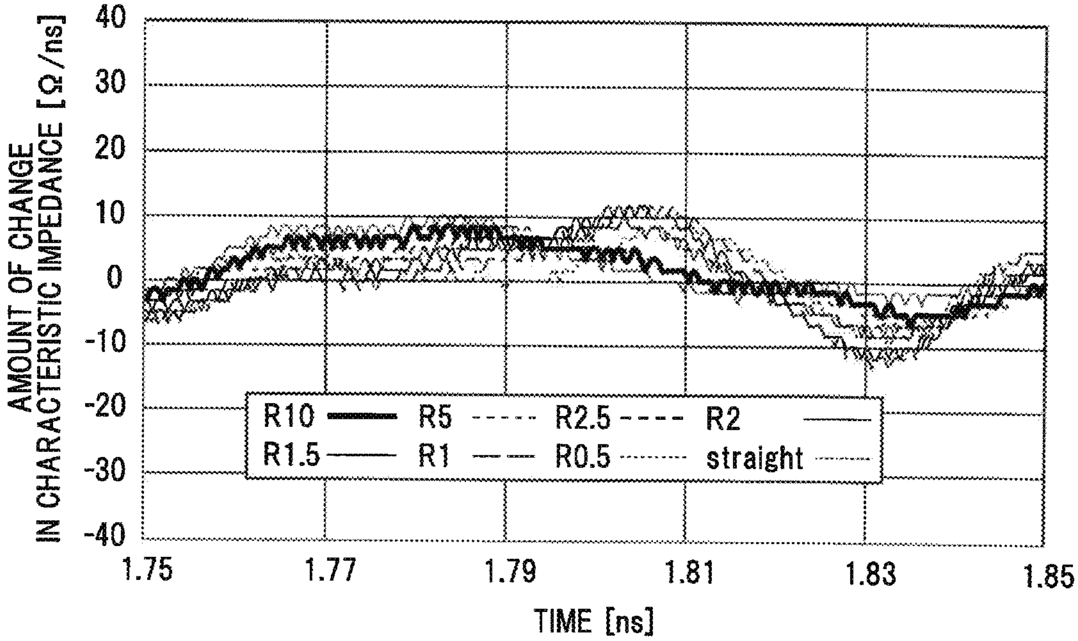
FIG. 3B is a graph chart showing an amount of change in the characteristic impedance calculated from the measurement results in FIG. 3A.
Figure 4A:
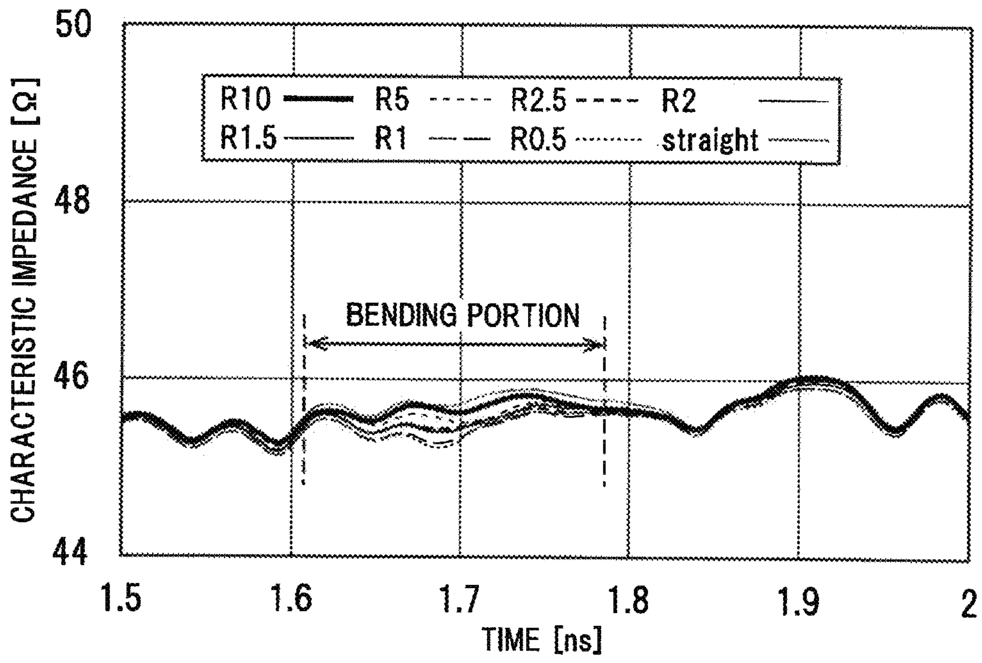
FIG. 4A is a graph chart showing measurement results of a characteristic impedance of Example 2 in bending test.
Figure 4B:
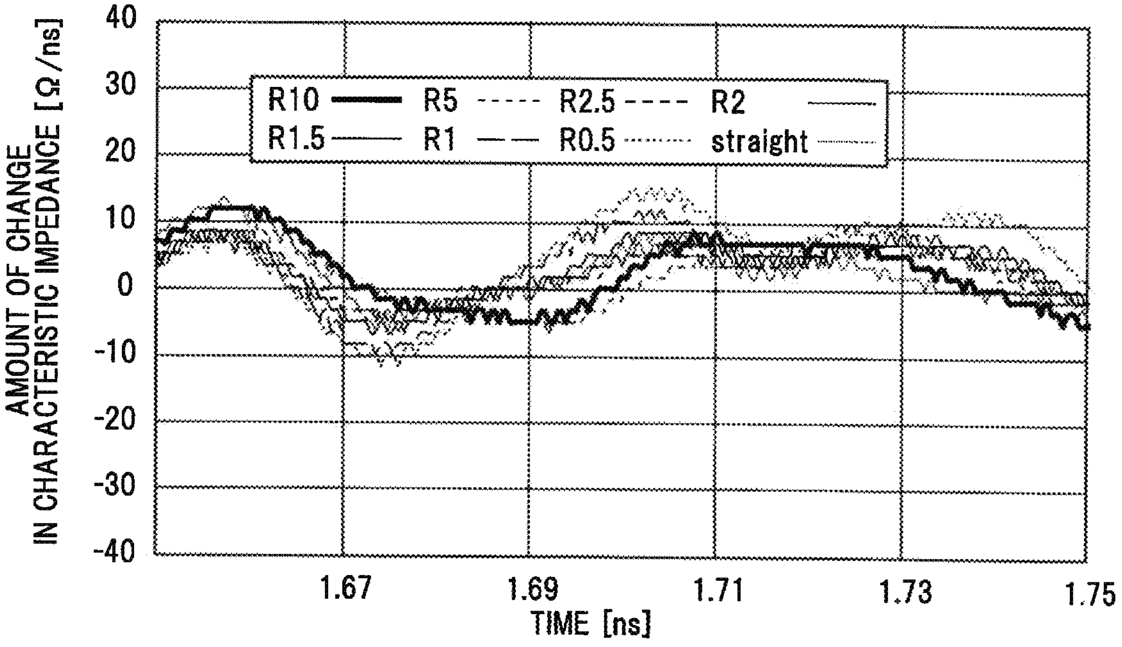
FIG. 4B is a graph chart showing an amount of change in the characteristic impedance calculated from the measurement results in FIG. 4A.
Figure 5A:
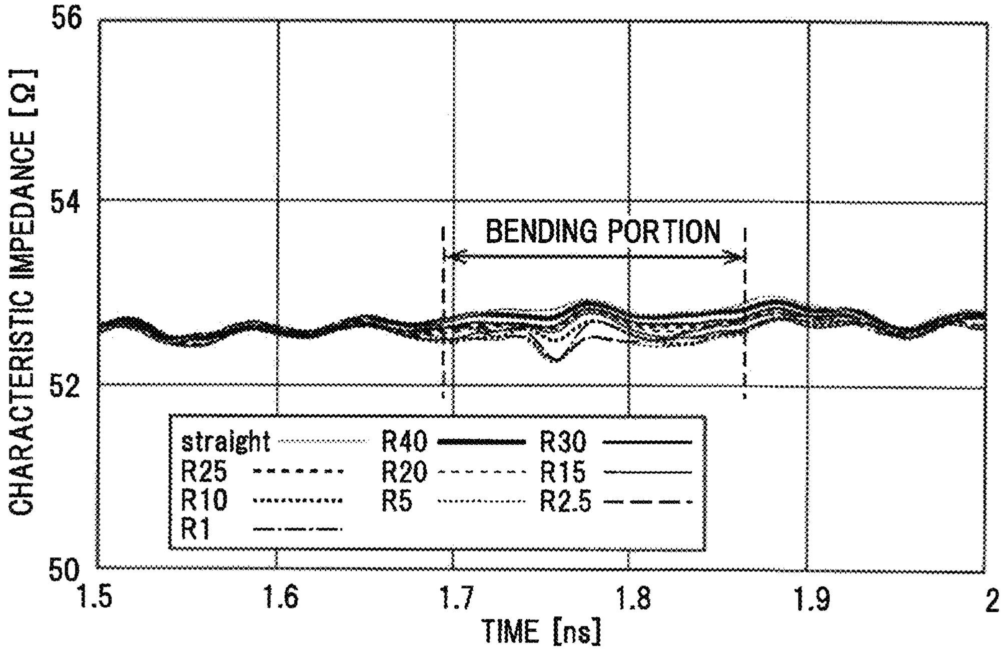
FIG. 5A is a graph chart showing measurement results of a characteristic impedance of a comparative example in bending test.
Figure 5B:
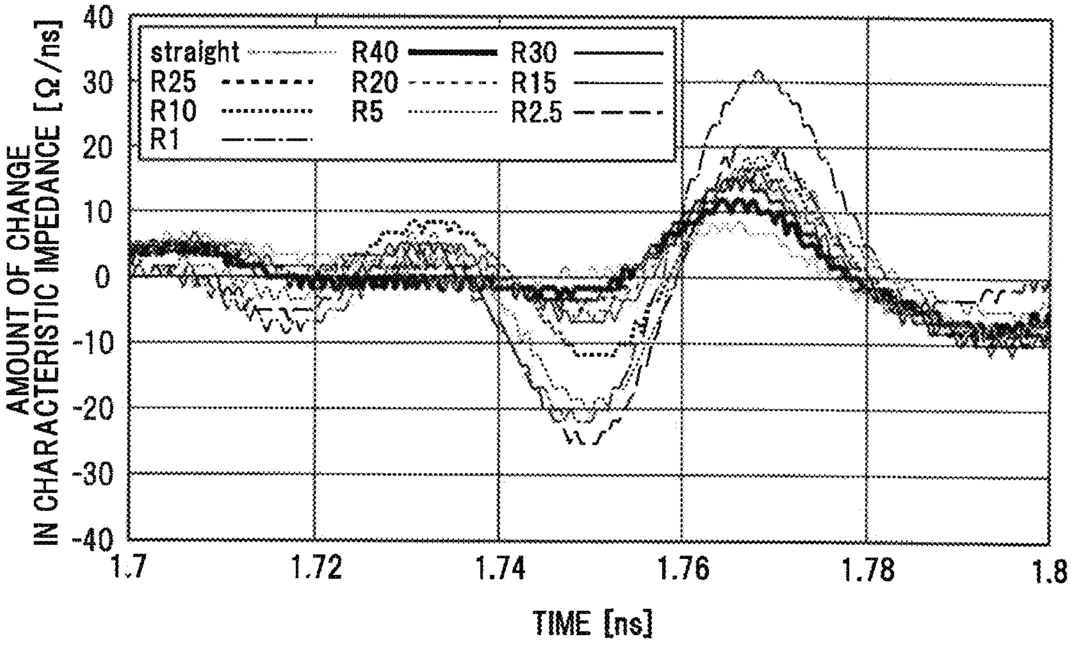
FIG. 5B is a graph chart showing an amount of change in the characteristic impedance calculated from the measurement results in FIG. 5A.

In the bending test, the characteristic impedance was measured by changing the bending radius R when bending the coaxial cable 1. The measurement results of Example 1 are shown in FIGS. 3A and 3B, the measurement results of Example 2 are shown in FIGS. 4A and 4B, and the measurement results of the comparative example are shown in FIGS. 5A and 5B.

In addition, the bending strain c when the coaxial cable is bent can be calculated from the following formula (4), $$\varepsilon=\{(D/2)/(R+(D/2)+T)\} \quad (4),$$

where D is the cable outer diameter, R is the bending radius, and T is the thickness of the sheath 5. The bending strain c for each bend radius in Examples 1, 2 and the comparative example are summarized in Table 1.

TABLE 1

| | Example 1 | | Example 2 | | Comparative example | |
|---|---|---|---|---|---|---|
| Bending radius R (mm) | Cable outer diameter D (mm) | Bending strain ε (%) | Cable outer diameter D (mm) | Bending strain ε (%) | Cable outer diameter D (mm) | Bending strain ε (%) |
| 5 | 0.575 | 5.4 | 0.400 | 3.8 | 1.080 | 9.7 |
| 4 | | 6.6 | | 4.7 | | 11.8 |
| 3 | | 8.6 | | 6.2 | | 15.0 |
| 2.5 | | 10.1 | | 7.3 | | 17.5 |
| 2 | | 12.3 | | 8.9 | | 20.8 |
| 1 | | 21.5 | | 16.0 | | 34.0 |
| 0.5 | | 34.3 | | 26.7 | | — |

As shown in FIGS. 3A, 3B, 4A, and 4B, in the coaxial cable 1 in Examples 1 and 2, significant impedance changes due to bending were not observed. Also, the appearance of the shield layer 4 after the bending test was visually inspected and no cracks in the batch plating portion 42 in Examples 1 and 2 were observed.

Figure 6A:
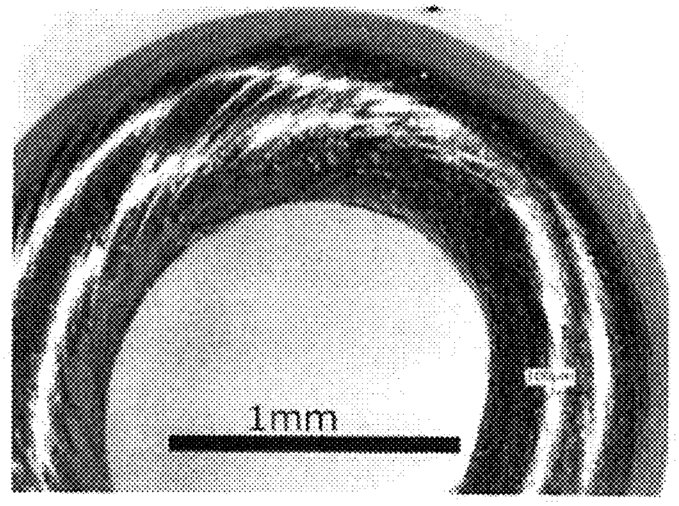
FIG. 6A is a photographic image of an appearance of a shield layer 4 in Example 1 being observed after the bending test.
Figure 6B:
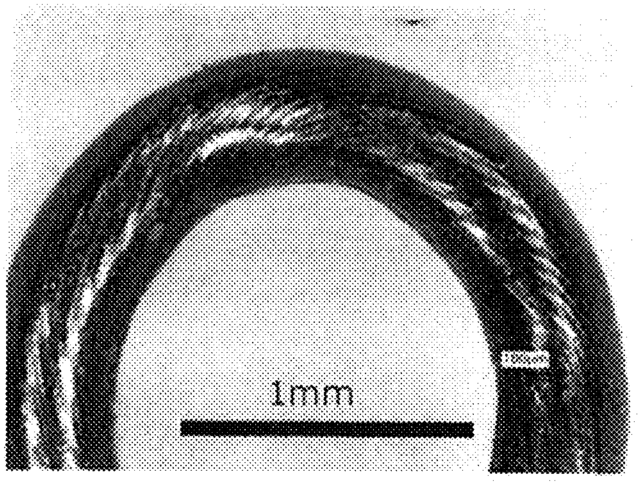
FIG. 6B is a photographic image of an appearance of a shield layer 4 in Example 2 being observed after the bending test.

In more detail, it was confirmed from Table 1, FIG. 3B and FIG. 4B that when the coaxial cable 1 according to the present embodiment was bent in the U-shape within a range of the bending strain of 35% or less (preferably 34.3% or less), the amount of change in characteristic impedance was reduced to be 16 Ω/ns or less, and that no cracks occurred in the batch plating portion 42. FIGS. 6A and 6B are the photographic images showing the appearance of the shield layer 4 observed after the bending test in the case where the bending radius R was set to 0.5 mm in Examples 1 and 2. As shown in FIGS. 6A and 6B, the appearance of the shield layer 4 after the bending test was visually inspected and no buckling in the batch plating portion 42 was observed.

Figure 6C:
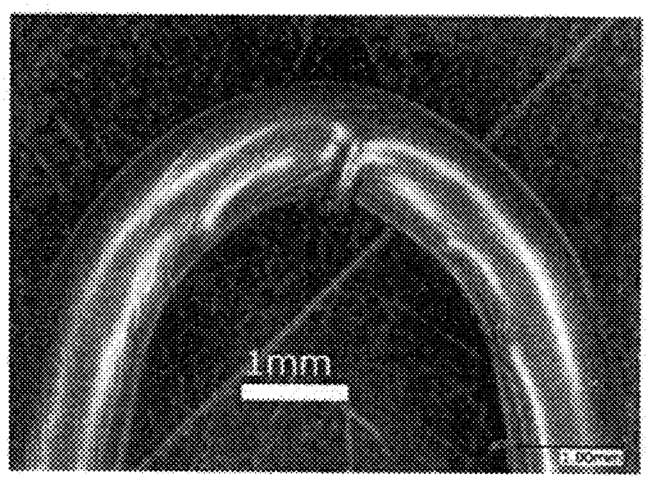
FIG. 6C is a photographic image of an appearance of a shield layer 4 in the comparative example being observed after the bending test.

On the other hand, as shown in FIGS. 5A and 5B, it is understood that the change in characteristic impedance was greater than 16 Ω/ns when the coaxial cable in the comparative example cable has the bending radius of 5 mm or less. This was assumed to be caused due to the cracks in the batch plating portion 42. Also, FIG. 6C is the photographic image showing the appearance of the shield layer 4 observed after the bending test in the case where the bending radius R was set to 1 mm (the bending strain ε=34.0). As shown in FIG. 6C, the appearance of the shield layer 4 after the bending test was visually inspected and the occurrence of buckling in the batch plating portion 42 was observed. Thus, it was confirmed that the cracks occurred in the batch plating portion 42 at least when the bending radius R is set to be 5 mm or less (when the bending strain was 9.7 or more) in the comparative example which does not meet the condition t<0.5d.

(Cable Assembly)

Figure 7:
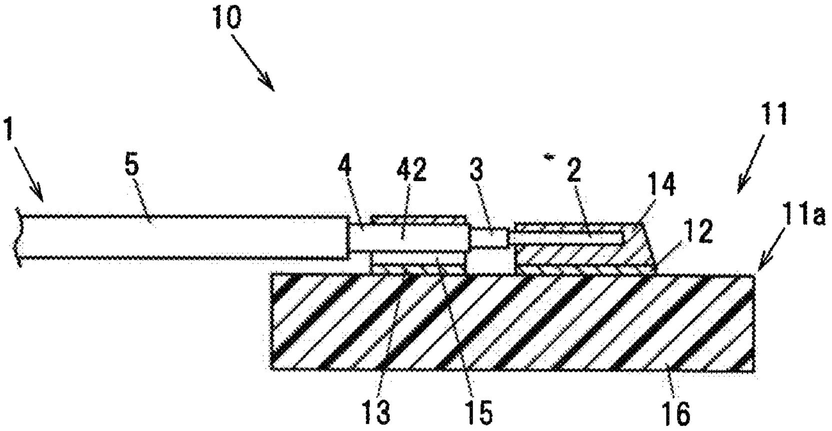
FIG. 7 is a diagram showing a cross-sectional view of a terminal portion of a cable assembly according to the embodiment of the present invention.

Next, the cable assembly using the coaxial cable 1 will be described below. FIG. 7 is a diagram showing a cross-sectional view of a terminal portion of the cable assembly according to the embodiment of the present invention.

As shown in FIG. 7, a cable assembly 10 includes the coaxial cable 1 in the present embodiment, and a terminal member 11 provided integrally with at least one end of the coaxial cable 1.

The terminal member 11 is, e.g., a connector, a sensor, a substrate mounted in the connector or sensor, or a board in an electronic device. FIG. 7 shows the case where the terminal member 11 is a substrate 11*a*. On the substrate 11*a*, there are formed a signal electrode 12 to which the conductor 2 is connected and a ground electrode 13 to which the shield layer 4 is connected. The substrate 11*a* is composed of a printed circuit board in which a conductor pattern including the signal electrode 12 and the ground electrode 13 is printed on a base material 16 composed of resin.

At the terminal portion of the coaxial cable 1, the sheath 5 is removed from the terminal for a predetermined length to expose the shield layer 4, and terminal portions of the shield layer 4 and the insulator 3 are further removed to expose the conductor 2. The exposed conductor 2 is secured to the signal electrode 12 with a first bonding material 14 such as solder, and the conductor 2 is electrically connected to the signal electrode 12. In addition, the exposed shield layer 4 is secured to the ground electrode 13 with a second bonding material 15 such as solder, and the shield layer 4 is electrically connected to the ground electrode 13. The connection of the conductor 2 or the shield layer 4 may be performed without using the first bonding material 14 or the second bonding material 15 such as solder. For example, the conductor 2 or the shield layer 4 may be connected by caulking the conductor 2 or the shield layer 4 to be connected to a fixing clasp. In addition, if the terminal member 11 is a connector or sensor, the conductor 2 or the shield layer 4 may be connected directly to the electrode or element.

(Functions and Effects of the Embodiment)

As explained above, in the coaxial cable 1 according to the embodiment, the shield layer 4 includes the lateral winding shield portion 41, which is formed by the plurality of metal wires 411 being helically wrapped around a periphery of the insulator 3, and the batch plating portion 42 composed of the molten plating and provided to cover the periphery of the lateral winding shield portion 41, in which, where the diameter of the metal wire 411 is d and the thickness of the batch plating portion 42 from the outer surface of the metal wire 411 is t, the following formula (1) is met over the entire cable circumference, $$t<0.5d \tag{1},$$

and when the cable is bent in the U-shape within the bending strain range of 35% or less, no cracks occur in the batch plating portion 42.

According to this configuration, the shield layer 4 is continuous substantially all around (over the substantially entire periphery) via the batch plating portion 42, so that the gap between the metal wires 411, 411 of the lateral winding shield portion 41 can be blocked by the batch plating portion 42, thereby improving the noise characteristics and suppressing the occurrence of suck-out. In other words, according to the embodiment, it is possible to achieve the coaxial cable 1 which is resistant to the degradation in the shielding effect and resistant to the occurrence of the rapid attenuation in a predetermined frequency band (for example, frequency band up to 26 GHz).

In addition, by setting the thickness t of the batch plating portion 42 to be less than 0.5d, the cracks are less likely to occur in the batch plating portion 42 when the coaxial cable 1 is bent with a small bending radius, and the variation in flexibility and the variation in bending property due to uneven thickness t of the batch plating portion 42 can be suppressed. In addition, it is possible to increase the flexibility and repetitive bending property, and to increase the bending life.

SUMMARY OF THE EMBODIMENTS

Next, the technical ideas grasped from the embodiment will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

According to the feature [1], a signal transmission cable 1 includes a conductor 2, an insulator 3 covering a periphery of the conductor 2, a shield layer 4 covering a periphery of the insulator 3, and a sheath 5 covering a periphery of the shield layer 4, wherein the shield layer 4 includes a lateral winding shield portion 41 including a plurality of metal wires 411 being helically wrapped around the periphery of the insulator 3 to cover the periphery of the insulator 3, and a batch plating portion 42 composed of a hot dip plating, which is covering a periphery of the lateral winding shield portion 41, in which where a diameter of the metal wire 411 is d and a thickness of the batch plating portion 42 from an outer surface of the metal wire 411 is t, a following formula is met over an entire cable circumference, $$t<0.5d,$$

and when being bent in a U-shape within a range of a bending strain of 35% or less, no cracks occur in the batch plating portion 42.

According to the feature [2], in the signal transmission cable 1 as described in the above feature [1], when being bent in the U-shape within the range of the bending strain of 35% or less, an amount of change in characteristic impedance is 16 Ω/ns.

According to the feature [3], in the signal transmission cable 1 as described in the above feature [1] or [2], a following formula is met over the entire cable circumference, $$0<t<0.5d.$$

According to the feature [4], a cable assembly 10 includes the signal transmission cable 1 as described in any one of the above features [1] to [3], and a terminal member 11 integrally provided to at least one end portion of the signal transmission cable 1.

Although the embodiments of the present invention have been described above, the aforementioned embodiment are not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

The invention claimed is:

1. A signal transmission cable, comprising:

a conductor;

an insulator covering a periphery of the conductor; and a shield layer covering a periphery of the insulator, wherein the shield layer includes a lateral winding shield portion comprising a plurality of metal wires being helically wrapped around the periphery of the insulator to cover the periphery of the insulator, and a batch plating portion comprising a hot dip plating, which is covering a periphery of the lateral winding shield portion, wherein the shield layer includes a space portion where adjacent wires of the plurality of metal wires in a circumferential direction are spaced apart from each other and a contact portion where adjacent wires of the plurality of metal wires in the circumferential direction are in contact with each other, wherein the shield layer includes outer peripheral portions where the plurality of metal wires is being covered with the batch plating portion, forming a joining portion, wherein where a diameter of each of the metal wires is d and a thickness of the batch plating portion from an outer surface of each of the metal wires is t, a following formula is met over an entire cable circumference, $$t<0.5d, \text{ and}$$

when being bent in a U-shape within a range of a bending strain of 35% or less, no cracks occur in the batch plating portion, an outer peripheral surface of the joining portion is located radially outward with respect to outer peripheral surfaces of the outer peripheral portions, wherein the diameter d of each metal wire is 0.10 mm or less, and wherein the thickness t of the batch plating portion from the outer surface of the metal wires is expressed as $t<0.5d$ (mm).

2. The signal transmission cable according to claim 1, wherein when being bent in the U-shape within the range of the bending strain of 35% or less, an amount of change in characteristic impedance is 16 Ω/ns.

3. The signal transmission cable according to claim 1, wherein a following formula is met over the entire cable circumference, $$0<t<0.5d.$$

4. A cable assembly, comprising:

the signal transmission cable according to claim 1; and a terminal member integrally provided to at least one end portion of the signal transmission cable.

5. The signal transmission cable according to claim 1, wherein the thickness $t<0.025$ mm.

* * * * *